Jan. 23, 1962 T. W. WLODEK 3,017,697
METHODS FOR DIFFERENTIAL PLASTIC DEFORMATION
OF METAL AND OTHER PLASTIC MATERIALS
Filed Dec. 6, 1955 4 Sheets-Sheet 1

*INVENTOR.*
TADEUSZ WLADYSLAW WLODEK
BY
*ATTORNEYS.*

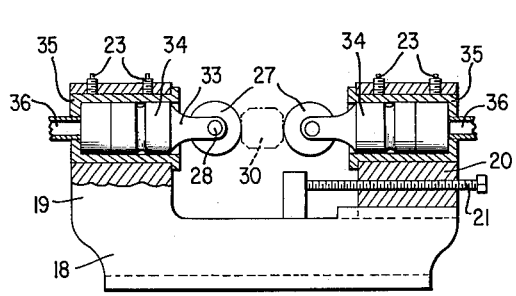
FIG 13
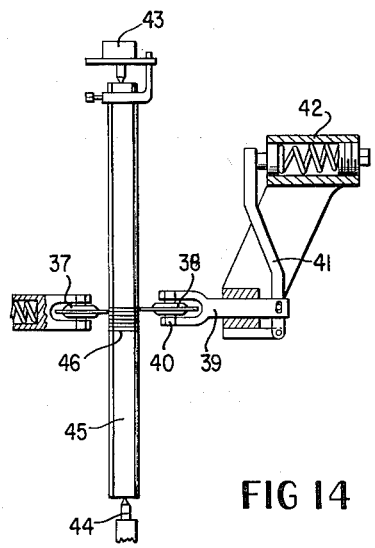
FIG 14
FIG 12a
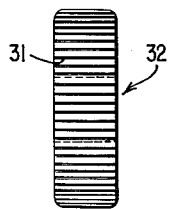
FIG 12b
FIG 12c
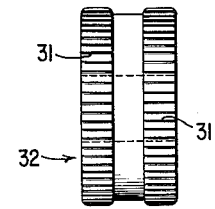
FIG 12d
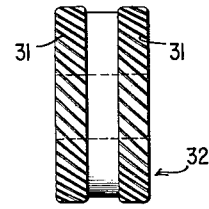
FIG 12e
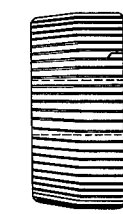
FIG 12f
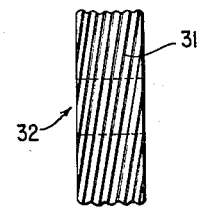
FIG 12g
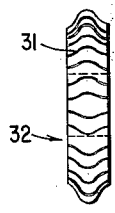
FIG 12h Jan. 23, 1962 T. W. WLODEK 3,017,697
METHODS FOR DIFFERENTIAL PLASTIC DEFORMATION
OF METAL AND OTHER PLASTIC MATERIALS
Filed Dec. 6, 1955 4 Sheets-Sheet 3

INVENTOR.
TADEUSZ WLADYSLAW WLODEK
BY
ATTORNEYS.

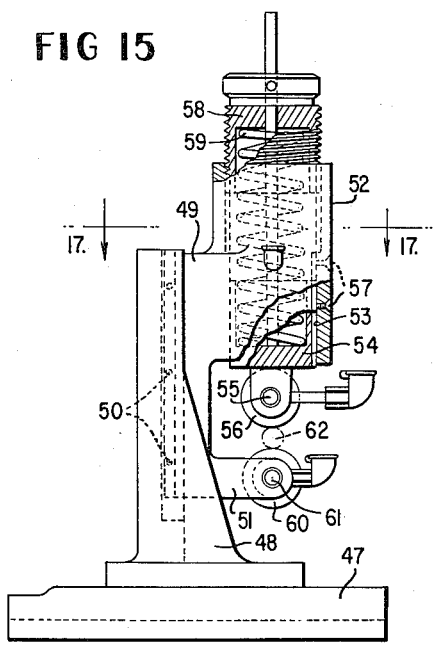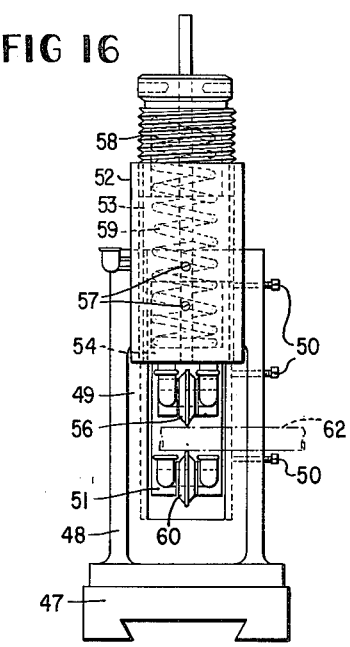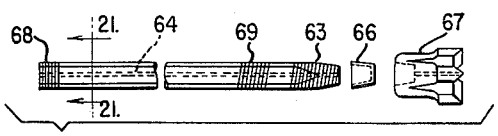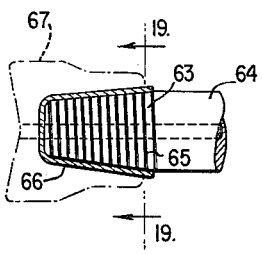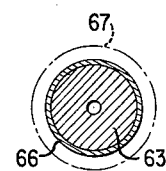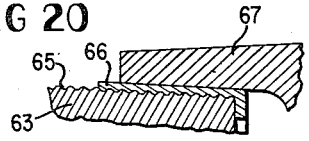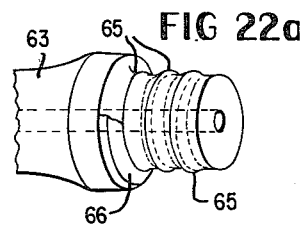
INVENTOR.
TADEUSZ WLADYSLAW WLODEK United States Patent Office 3,017,697
Patented Jan. 23, 1962

3,017,697
METHODS FOR DIFFERENTIAL PLASTIC DEFORMATION OF METAL AND OTHER PLASTIC MATERIALS
Tadeusz W. Wlodek, 297 5th Ave., Ottawa, Ontario, Canada
Filed Dec. 6, 1955, Ser. No. 551,455
Claims priority, application Canada June 11, 1953
4 Claims. (Cl. 29—552)

The following disclosure contains a correct and full description of the invention and of the best mode known to the inventor of taking advantage of the same.

This invention relates to a method of improving the physical properties of metal and other plastic materials having an elastic limit and the property of permanent deformation under pressure; their welds, joints, fillets, threads, metallurgical notches, and the like; and to different types of apparatus for carrying out the method.

It is well known that the physical or mechanical properties of metal constituting preformed elements may be strengthened and improved by various treatments such as shot-peening, regular cold rolling, carburizing or nitriding of steel, inducing hardening, heat treatment, and others. The fields in which the various methods have been employed depend on the nature of the metal to be treated, the shape of the element, and the economy of the treatment. A common method of improving the surface properties of steel axles or the like is to roll the entire surface of the axle under fairly high pressure. Such operation affords a small increase in the physical properties of the metal constituting the axle, and, because of longer time required, is a relatively costly operation.

It has now been discovered that surprisingly improved properties are produced in metals and other plastic material having an elastic limit and assuming permanent deformation under pressure constituting structural elements, rails, plates, bars, rods, tubes, drill pipes, drill pipe connectors-tool joints, thin airplane sheeting and channels and the like, of simple and complicated form, their welds, joints, fillets, threads, etc., by creating within the material locked-in residual stresses which work against the stresses imposed upon the structural element as it is used, thus increasing the useful life of the element, or the load which it is capable of carrying. These locked-in residual stresses are created by different types of apparatus developed for the purpose of applying pressure to portions of the material to give it permanent or so-called plastic deformation and leaving adjacent portions of the material in its normal or elastic form. It appears that the alternate juxtaposition of these regions of plastically deformed material with those in the normal elastic form or practically normal elastic form results in an interlocking of the internal stresses in the treated areas of the material to enable the structural element to withstand heavier loads or have a longer useful life.

This new treatment is based on the creation of locked-in residual stresses through the introduction of mainly plastically deformed regions in alternate juxtaposition with regions substantially elastically deformed. In general, juxtaposition of regions plastically deformed with regions of lesser plastic deformation, both regions being arranged in a regular or irregular pattern, is the topic of this treatment. The transition between these two regions may be gradual or abrupt, and the built-in residual stresses are substantially perpendicular to the direction of plastically deformed regions, i.e. direction of pattern. It should be also emphasized that impression of grooves and depressions provides, through so-called mutual interlocking phenomena, a controllable mechanism of plastic deformation of treated surfaces, resulting in greatly improved physical qualities of material treated by this invention.

The invention is described particularly with reference to metals, but plastic materials, like resins, which have an elastic limit and take permanent deformation under pressure have been found to be improved in physical properties by the method of the invention.

It is an object of this invention to provide a method for greatly increasing the physical properties of metallic or other plastic elements by rolling or otherwise impressing grooves or depressions of various patterns and shapes on the surface of such elements and an effective apparatus for carrying out this method.

It is a particular object of this invention to provide an apparatus for improving the physical properties, particularly resistance to fatigue, of a drill rod, drill rod bit attachment, drill pipe, drill bits, shafts and similar elements, and connectors of all these elements, by rolling on or impressing on the outside or on the inside or on both surfaces a plurality of shallow grooves or depressions, or both, on the engaging end of these elements, threaded connections, and, if desired, on other parts thereof.

This application is a continuation-in-part of application Serial No. 373,369 filed August 10, 1953, now abandoned.

The invention will be described with reference to the accompanying drawings, in which.

Figure 12:
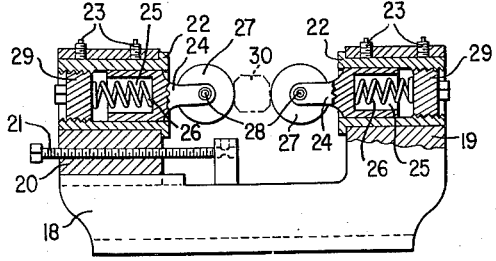
Figure 13A:
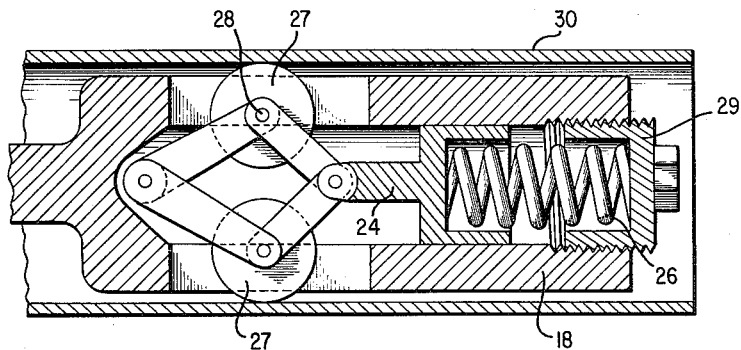

FIGURES 12, 13, and 13a, b, c, d, are elevation views partly in section of various forms of apparatus for carrying out the method of the invention;

FIGURE 12a, b, c, d, e, f, g, h, and i are elevation of different example of rollers used in my apparatus.

FIGURE 14 is a diagrammatic elevation view, partly in section, illustrating another form of apparatus for carrying out the invention;

FIGURE 15 is a side elevation view, partly in section, of another form of apparatus;

FIGURE 16 is a front elevation view of the apparatus shown in FIGURE 15;

FIGURE 17 is a section view taken on the line 17—17 of FIGURE 15;

FIGURE 18 is a section of a drill rod bit attachment with attached bit treated in accordance with the invention and in my apparatus;

FIGURE 19 is a section view along the line 19—19 of FIGURE 18;

FIGURE 20 is a blown up side elevation view of a drill rod, with conical drill rod attachment, thimble and bit, treated in my apparatus.

FIGURE 21 is a cross section view of the drill rod taken on the line 21—21 of FIGURE 20; and FIGURE 22 is an enlarged sectional view of a portion of a drill rod bit attachment assembly. FIGURE 22a is a view of a threaded drill rod attachment, treated in my apparatus.

In accordance with the invention the physical properties, especially fatigue, corrosion fatigue, stress corrosion, static and dynamic strength; resistance against fretting, wear and erosion of structural metal members are greatly improved by impressing shallow hollows, grooves or depressions at spaced intervals thereon, said intervals being so spaced as to leave between adjacent pairs of grooves or depressions or the like a portion of metal which has not been directly subjected to deformation.

The effect produced by the method of the invention is characterized by the magnitude and direction of the locked-in residual stresses which are produced in the metal of the structural element under treatment by the different combinations of; force used, direction of the applied force, patterns and their sequence, and the depth, shape and cross-section of the depressions and grooves. In order to increase the effect of my treatment the structural element, if required, could be treated while under stress. The residual stresses thus created are directed against the working stresses imposed on the structural element, with the result that the element has longer useful life and greater capacity to resist the strain caused by the load imposed on the element.

The hollows, grooves or depressions may be of any desired shape and may be applied by any desired means to various types of metal structural members, their welds and joints, fillets, treads, metallurgical notches, and the like, in a variety of patterns. The grooves or depressions may be impressed by rolling, spiral-rolling, extruding, pressing, stamping, hammering, squeezing, drawing and twisting and the like, depending upon the character of the form of the member to be treated. In the case of tubular metal members, pressure vessels, cylinders and other hollow members, the grooves or depressions may be impressed on the outer or inner surface or both; these impressed grooves and crests, the surface of which may be either machined or not, may serve also as guides for other moving elements or serve as a "grip" for paint, plastic and other surface protective material. It will be appreciated that the crests and troughs of the depressions or grooves may be subjected to any subsequent treatment such as machining, grinding, or the like. Furthermore, the grooves may be so designed as to provide guides for elements arranged to move along the surface thereof. For example, the rifling of a gun barrel may be produced by the method of the present invention. The grooves so formed partly, i.e. after pre-machining, or completely by this method not only greatly improve the physical properties of the gun barrel, through the "auto-frettage-rolling" described in my applications, but at the same time provide the necessary rifling. It will be obvious that there are many other practical adaptations of the present invention.

Figure 1:
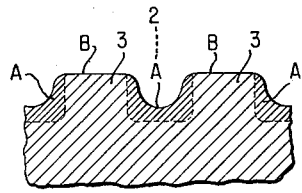
FIGURE 1 is an illustration of a structural element showing sections of plastically deformed metal, each in juxtaposed relation to a section of metal substantially in its normal elastic form, as produced by the invention.

In the enlarged view of FIGURE 1 there is illustrated pictorially the effect of forming on the surface of a metal member 1 valleys or grooves 2 leaving crests or untreated portions 3. As a result of the pressure applied to make the grooves or depressions 2 there is produced in the areas A metal of substantially all plastic or permanent deformation whereas the metal of areas B remains substantially in its original elastic form. The mutual interlocking stresses thus created in the metal are responsible for the great increase in the physical properties of the structural element treated by the invention. The magnitude of the locked-in compression stresses is controlled by the extent to which the plastically deformed metal is formed in areas A and by the relative width of the intervening plastic metal in areas B with lesser amount of plastic deformation. When pressure is applied equally to the whole surface of the metal element as in the ordinary cold rolling treatment, the mutually interlocking stresses produced by the present invention are not developed.

Figure 2:
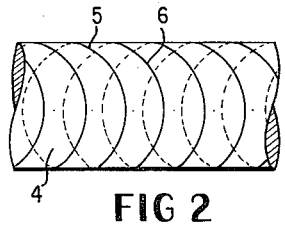
FIGURE 2 is a diagrammatic illustration of one pattern of treatment of a metal bar as produced by my apparatus.

FIGURE 2 shows diagrammatically a round metal bar 4 which has been treated to form on the surface of the bar, helical grooves or depressions 5 and 6 or any other multiple arrangement of helices.

Figure 3:
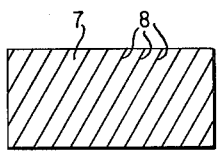
FIGURES 3, 4, 5, 6 and 8 are diagrammatic views showing various examples of patterns of treatment, as produced by the apparatus.
Figure 4:
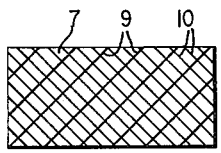
Figure 5:
Figure 6:
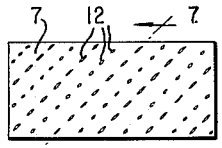
Figure 7:
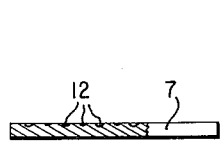
FIGURE 7 is a section view along the line 7—7 of the pattern shown in FIGURE 6, as produced by the apparatus.
Figure 8:
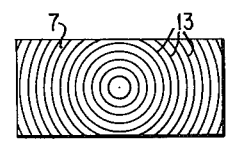

In FIGURE 3 the metal surface 7 has a plurality of spaced parallel grooves or depressions 8 diagonally impressed thereon, or parallel arrangements of spirals. In FIGURE 4 the metal surface 7 has two series of spaced parallel grooves or depressions 9 and 10, or parallel arrangement of spirals, impressed thereon. In this figure the two series of grooves are almost diagonally opposite in direction. In FIGURE 5 the metal surface 7 has a plurality of spaced parallel grooves or depressions 11. In FIGURES 6 and 7 the metal surface 7 has a plurality of spaced grooves or depressions 12. In FIGURE 8 the metal surface 7 has impressed thereon a plurality of concentric grooves or depressions 13. The grooves or depressions may be applied to the metal member in a great variety of patterns.

Figure 9:
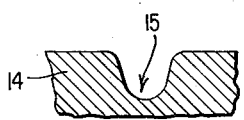
FIGURES 9, 10 and 11 are enlarged views in section of a piece of metal showing various examples of shapes of grooves and depressions, as produced by the apparatus.
Figure 10:
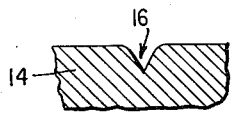
Figure 11:
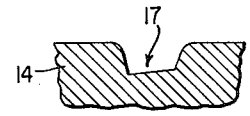

Representative illustrations of the shapes or contours of the hollows, grooves or depressions are shown in FIGURE 9, 10, and 11. In FIGURE 9 the metal element 14 has a U-shaped groove therein. In FIGURE 10 the groove 16 is V-shaped and in FIGURE 11 the groove 17 is rhombohedral, similar to the internal rifling of hollow elements.

The physical properties produced by impressing grooves or depressions or both in metal elements are also governed by the angle between the axis of the groove or depression and the axis of the element under treatment, or, in the case of single or multitple helical-rolling, the pitch of the pattern. To strengthen a bar, pipe or other element against reverse bending stresses, considerable locked-in compression stresses parallel to the longitudinal axis of the rod or element should be built up. In such cases the presence of locked-in compression stresses in the transverse direction is not essential, but longitudinal stresses as obtained with the pattern shown in FIGURE 2 or FIGURE 5, applied on the outside, inside or both surfaces where the pitch is small, are recommended. Performed measurements of the ratio of longitudinal and transverse locked-in compression stresses, gave for this pattern a factor larger than one. This results in the reduction of working stresses in bending, making possible a substantial saving in material.

To strengthen a structural element against torsional loads, e.g. drill pipes, suspension springs, torsion bars and tubes, shafts, where the tension compression stresses are directed at 45 degrees from the axis of the element, the grooves or depressions are preferably formed in a pattern having a relatively large pitch as in FIGURES 3 and 4. By using a pitch, $\pi$ times the diameter of the element to be treated, on the outside, inside or both surfaces, a 45 degree direction of forming the depression will create locked-in compression stresses directly opposed to the direction of the working torsion stresses.

In order to achieve the object of the invention the grooves or depressions made in the metal surface of the element under treatment should be at least 0.001″ (0.025 mm.). In extremely hard metal the depressions, formed by the pressure applied at spaced intervals, are very shallow. The preferred range of depth is $\frac{1}{200}$″ (0.12 mm.) to $\frac{1}{64}$″ (0.4 mm.). It will be apparent that the spacing of grooves or depressions and the depth used will be dependent on the form of the groove employed. The preferred distance between the grooves is $\frac{1}{8}$″ (3.2 mm.) to $\frac{1}{64}$″ (0.4 mm.) and for general application $\frac{1}{24}$″ (1.08 mm.) is preferred.

The illustrative examples of the benefits obtained by the invention are given below, using standard American "Almen" strip or split-ring method for hollow elements, as a direct indication of the magnitude of locked-in compression stresses and as proof of the improvement of physical properties of structure and machine elements treated by our method and apparatus.

(1) Plates .0938″ thick, 3 inches long and ½ inch wide, made of high grade steel, were treated by application to one flat surface thereof of 700 pounds pressure to form transversal grooves as indicated in the following tabulation which shows the permanent deflection created in each plate. The amount of this deflection is a direct indication of the magnitude of locked-in compression stresses and of the improvement of the physical properties of the metal as previously described. This is a well known standard test, the so-called "Almen" strip.

| Space Between Grooves | | Width of Groove, mm. | Untreated Portion | | Deflection, 1/1000" |
|---|---|---|---|---|---|
| Inches | mm. | | Width, mm. | Surface, Percent | |
| Untreated | ----- | ----- | ----- | 100 | 0 |
| 1/8 | 3.17 | 0.6 | 2.57 | 81 | 6.0 |
| 1/16 | 1.59 | 0.6 | 0.99 | 62 | 6.0 |
| 1/24 | 1.06 | 0.6 | 0.46 | 43 | 10.5 |
| 1/32 | 0.80 | 0.6 | 0.20 | 24 | 13.5 |

(2) Tests of the effect of shot-peening and pattern-rolling on SAE 1060 steel gave the following comparative results: At a stress of 60,000 p.s.i. the untreated metal failed on 56,000 cycles, the shot-peening sample failed on 65,000 cycles, and the pattern-rolled sample on 465,000 cycles.

Bars of one inch quarter octagon Cr-Ni-Mo drill steel were treated by helical rolling at a pressure of 700 pounds to form grooves 1/64" (0.4 mm.) deep and spaced apart 1/24" (1.06 mm). The bars were then loaded and subjected to reversed bending stresses with the results indicated below:

| Load, in.-lb. | Stress, p.s.i. | Cycles to Failure | | Endurance Increased, times |
|---|---|---|---|---|
| | | Untreated | Treated | |
| 7,000 | 57,500 | 350,000 | Unbroken at 6 × 10⁶. | 17 |
| 8,000 | 65,800 | 282,000 | -----do------- | 21.5 |
| 9,000 | 74,000 | 80,000 | -----do------- | 75 |

(3) A similar test on 7/8" quarter octagon SAE 1080 (carbon steel) drill rod gave the following results:

| Load, in.-lb. | Stress, p.s.i. | Cycles to Failure | | Endurance Increased, times |
|---|---|---|---|---|
| | | Untreated | Treated | |
| 5,000 | 61,500 | 90,000 | 1,055,000 | 11.5 |

(4) Plates .065" thick of aluminum alloy "24 ST-cladded" and magnesium alloy "MA" were treated as in Example 1, the pressure applied being 45 pounds, with the following results:

ALUMINUM—"24 ST-CLADDED" ALLOY

| Space Between Grooves | | Width of Groove, mm. | Untreated Portion | | Deflection, 1/1000" |
|---|---|---|---|---|---|
| Inches | mm. | | Width, mm. | Percent | |
| Untreated | ----- | ----- | ----- | 100 | 0 |
| 3/32 | 2.38 | 0.5 | 1.88 | 79.2 | 5.0 |
| 3/64 | 1.19 | 0.5 | 0.69 | 58 | 8.0 |
| 1/32 | 0.80 | 0.5 | 0.30 | 36.7 | 11.0 |

MAGNESIUM—"MA" ALLOY

| Untreated | ----- | ----- | ----- | 100 | 0 |
|---|---|---|---|---|---|
| 3/32 | 2.38 | 0.6 | 1.78 | 74.8 | 5.0 |
| 3/64 | 1.19 | 0.6 | 0.59 | 49.6 | 12.0 |
| 1/32 | 0.80 | 0.6 | 0.2 | 24.1 | 18.0 |

(5) Plates .065" thick of plastic resin were treated as in Example 1, the pressure applied being 45 pounds, with the following results:

| Space between grooves | | Width of groove, mm. | Untreated portion | | Deflection, 1/1000" |
|---|---|---|---|---|---|
| Inches | mm. | | Width, mm. | Percent | |
| Untreated | ----- | ----- | ----- | 100 | 0 |
| 1/24 | 1.06 | 0.6 | 0.47 | 43 | 25 |

Similar indications on the magnitude of locked-in residual stresses, on the surfaces of elements treated according to this invention, have been obtained using split-ring method on hollow elements.

One example of an apparatus is shown in FIGURE 12. This apparatus could be adapted as an attachment to an ordinary lathe or other workshop machine; it comprises a base 18, an upright fixed support 19, and an upright movable support 20 which is slidably adjustable on the base 18 by screw means 21. The supports 19 and 20 each carry a removable sleeve 22 which is retained in position by set screws 23. Guided and slidably mounted in each sleeve 22 is a roller support 24 one end 25 of which is tubular in shape to engage a spring 26 and the opposite end of which carries a roller 27 on an axle 28. The compression on the spring 26 may be adjustably varied as desired by a threaded plug 29. The structural member 30 under treatment is, in this case, a quarter-octagon bar. Each roller has a peripheral contour complementary to the shape of groove or depression and of pattern which it is proposed to impress in the surface of the element being treated, as for instance is shown in FIGURES 2 to 11. The periphery of the roller may be smooth as is shown in FIGURE 12 or notched as shown at 31 on roller 32 in FIGURE 12a.

It will be apparent since the rollers 27 are resiliently urged towards each other they may be employed to impress grooves or depressions in the surface of elements of varying cross-sectional shapes.

In FIGURE 12b a roller 32 has a plurality of grooves 31 parallel to the axis of rotation of the roller.

In FIGURE 12c a roller 32 having grooves 31 which are at an angle of about 45° to the axis of rotation of the roller is shown.

In FIGURE 12d is shown a roller 32, having two spaced grooved sections carrying grooves 31 which are parallel to the axis of rotation of the roller.

FIGURE 12e shows a roller 32 similar to that shown in FIG. 12d except that the grooves 31 are at an angle of approximate 45° to the axis of rotation of the roller.

In FIGURE 12f there is illustrated a roller 32 having a surface parallel to the axis of rotation of the roller. This type of roller is especially adapted for rolling a rod or the like having a tapered end portion; for example, the conical attachment section of a drill rod. It will be understood that the conical, parallel and otherwise shaped surfaces may be provided on two or more separate rollers instead of the single roller shown. It may be stated that the loading edge of any of the rollers may be tapered or shaped to facilitate engagement with the article to be treated.

In FIGURE 12g a roller 32 having grooves 31 inclined at a very steep angle to the axis of rotation of the roller is shown.

Figure 12I:
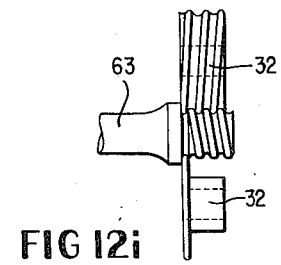

FIGURE 12h illustrates a roller 32 having grooves 31 substantially parallel to the axis of rotation of the roller. Type of rollers shown in FIGURES 12g and 12h are especially adapted for treating the crests and troughs of threads of drill rod attachments in accordance with the method of the invention and as shown in FIGURE 22a and FIGURE 12i.

Any of the above described rollers either in matched or unmatched pairs or groups of two or more may be provided in any of the various forms of apparatus to carry out the method of the present invention. It will be apparent that the angular relation of the grooves with respect to the axis of rotation of the roller may vary from 0° to 90° depending on the nature of the desired treatment. It should also be noted that the types of rollers illustrated are examples only, and any variation as to number and direction of depressions or grooves, or combination of rollers may be used. If required all or some of the rollers may be mutually synchronized or interlocked in order to obtain a regularly reproduced pattern.

In some instances it may be preferable to use only one of the pair of rollers for impressing the necessary depressions or grooves, the other roller having a smooth periphery and employed to balance the pressure of the first roller and guide the treated element or apparatus used. The smooth roller is used for smoothing or over-rolling the pattern impressed by the first roller. If more than two rollers are employed in any one operation, at least one of the rollers may be used for impressing the necessary depressions and at least one of the remaining rollers employed for smoothing or over-rolling. Treatment of structural elements by a method which includes over-rolling is effective in building up and regulating locked-in residual stresses.

It may be stated here that the leading edge of any of the rollers may be tapered or shaped to facilitate engagement with the article to be treated.

Another form of apparatus is illustrated in FIGURES 13, 13a, 13b, 13c and 13d. The apparatus in FIGURE 13 is similar in all respects to that shown in FIGURE 12 except that the pressure on roller supports 33 is obtained by hydraulic pistons 34 and cylinders 35 which are supplied with fluid through tubes 36.

The apparatus for treating the interior surfaces of hollow members, e.g., cylinders, hollow-shafts, marine-shafts, tubes, gun barrels, drill pipes and the like and connectors of all these elements, are illustrated in FIGURES 13a, 13b, 13c and 13d.

The apparatus shown in FIGURE 13a comprises a frame 18 having a bore in which is mounted a lazy-tong arrangement supporting a pair of rotatable rollers 27 on axle 28. A spring 26 mounted in the frame 18, and which is adjustable by means of a threaded plug 29, provides the necessary force to the rollers.

Figure 13B:
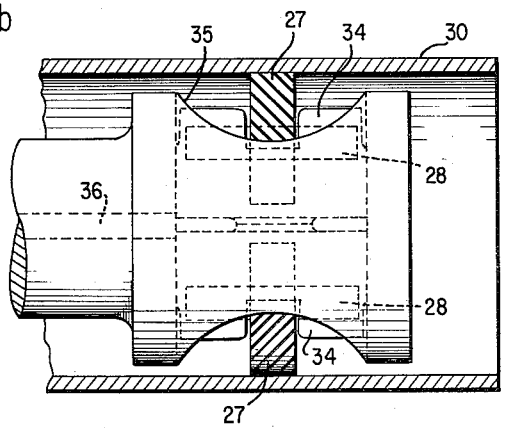

The apparatus shown in FIGURE 13b comprises a frame 35 having a transverse cylindrical bore in which is mounted a pair of pistons 34. Each piston carries an axle 28 on which is rotatably mounted a roller 27. Hydraulic pressure is applied through opening 36 to the piston 34 and thus supplies the necessary force on the pistons and rollers 27. If desired this apparatus may be altered to one having a fixed diameter by simply removing the hydraulic line and placing the required number of shims, plates or flat springs between the inner ends of the pistons. It will be obvious that any suitable arrangement to maintain the rollers in proper relation to the surface to be treated and to prevent the pistons from expanding beyond a safe limit, if required could be provided.

Figure 13C:
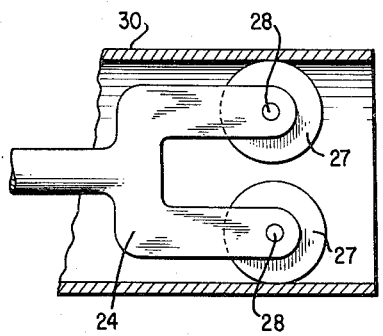
Figure 13D:
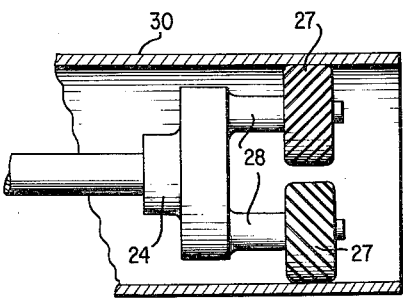

A portion of a fixed diameter apparatus is shown in FIGURES 13c and 13d, and comprises a supporting head 24 carrying a pair of rotatably mounted rollers 27 on axle 28, in fixed spaced relation to each other.

All apparatus described in this invention may be pushed, pulled and/or rotated along the structural member under treatment.

In FIGURE 14 a variation of the apparatus shown in FIGURES 12 and 13 is illustrated. The roller 37 is spring loaded as in FIGURE 12 and the roller 38 is mounted on a support 39 through an axle 40. The required pressure is applied to the support 39 through the lever arm 41 by a spring arrangement 42. The lever arrangement allows the use of a lighter spring in order to obtain the desired pressure on the rollers. The apparatus is adapted to be mounted on the ordinary lathe having a driving head 43 and a supporting spindle 44 or in other workshop machines. The bar 45 is rotated and moved relatively forward by the head 43 between the rollers 37 and 38 to form a pattern 46. Hydraulic cylinders as shown in FIGURE 13 may be used to replace the springs.

In FIGURES 15, 16 and 17 another form of suitable apparatus is shown. The apparatus comprises a base 47 adapted for attachment to the bed of an ordinary lathe or other workshop machine, a fixed frame member 48 mounted on the base 47 and a movable frame member 49 slidably carried by the fixed frame member and adjustable relative thereto by set screws 50. The movable frame has a lower supporting arm 51 and an upper portion 52 having a bore 53 extending throughout. A tubular sleeve or roller supporting member 54 carrying an axle 55 and a roller 56 is slidably mounted in the lower end of the bore 53, guided by a key fixed by means of set screws 57. A threaded cup 58 in the upper end of the bore 53 controls the pressure on a spring 59 in bore 53. Spring 59 is interposed between sleeve 54 and cup 58. A roller 60 on an axle 61 is carried by the supporting arm 51. When a treated object 62 is inserted between the rollers 56 and 60 the rollers are forced apart, the pressure on the roller 56 being transferred by the sleeve 54 to the lower end of the spring 59 and the pressure on the roller 60 through the movable member 49 and the cup 58 to the upper end of the spring 59.

In use, the above apparatus is mounted on an ordinary lathe and the object to be treated is clamped in the lathe chuck or driving head of the lathe or any other machine used for that purpose. The desired pressure is applied to the bar by the rollers 56 and 60 through the spring 59 or by hydraulic means 34, 35 and 36 as shown in FIGURE 13 and 13b. As the lathe is operated the treated element is rotated and the desired pattern is formed on the element.

The different types of apparatus described above could be used for longitudinal, transverse or spiral pattern rolling after adjusting correspondingly the direction of rollers, its feed and relative movement of treated elements. If desired, one or more of the rollers could be used, by the angular arrangement of the pattern of the roller or the position of the roller as feeding device of our apparatus during the treatment.

It will be understood that each pair of rollers in each form of apparatus illustrated may be arranged with their peripheries in alignment or in offset non-overlapping substantially parallel relation depending upon the pitch and multiplicity of the grooves or depressions and their pressure patterns to be applied to the element under treatment. Furthermore, a plurality of rollers and their combinations of different shapes, dimensions with different patterns and with smooth surfaces if required may be used in each or any form of apparatus above described; one or more of these rollers could have a smooth periphery and be used to balance the pressure of the other pattern-roller or used for the smoothing and over-rolling operation of the pattern impressed by the other roller.

With particular reference to the results obtained from the measurements of the magnitude of locked-in residual stresses as produced by the method of this invention, it will be observed that the invention is of far-reaching importance in the treatment of drill rods, drill rod bit attachments, oil drill pipes, drill bits, shafts, pipes, gun barrels and the like, and connectors of all these parts. The portion of the element which engages the drill bit or other element is normally most vulnerable to breakage and the application of the present treatment with the apparatus invented to that portion increases the useful life of the element by at least 70%. In some tests the life of the rod was increased as much as 700% and in many cases the drill rod failed in the untreated section.

A particularly useful form of drill rod, drill rod bit attachment, and similarly, drill pipe, shaft and the like, is shown in FIGURES 18 to 22a, inclusive. The bit end or connector end 63 of the rod 64 using the apparatus described, is treated over a length required to form grooves or depressions 65 of various patterns. The treated end of the rod may be surrounded by a wrapping or a continuous unsplitted thimble 66 pressed from one piece of homogeneous or plated metal. When the rod, or the like, so wrapped or capped, is forced into the socket of the bit 67 or other connector, the metal from the thimble enters the grooves and protects the latter from fretting and corroding, thus maintaining the desired physical properties of the treated rod. Similarly, for threaded, push-on, and other types of bit attachments or connector ends, the metal thimble or shaped ring 66 has a shape conforming with the whole or part of the engaging portions of these elements, to provide a mechanical and electrochemical protection.

Referring to FIGURE 20, for some purposes it is best to treat the rod, and similarly drill pipe, shaft, tubes and the like, with spiral grooving or other various patterns at other desired zones. Such zones may be, as indicated at 68, at the driving end of the rod which is subjected to additional stresses and, as indicated at 69, at the area adjacent to the heat treated bit or connecting end 63 of the drill rod or other element. This latter area 69 of heat transition zone is commonly termed the metallurgical notch.

An additional object of this invention and application of our apparatus is to roll, either on the outside or on the inside, the whole surface of drill pipes; drill rods; conical threaded or push-on drill rod bit attachments, and connectors of these elements, at least one zone along its length, using apparatus and rollers developed for this purpose in this invention. In order to obtain, at least partially, the beneficial effect of typical spiral-rolling or pattern-rolling according to the main idea of my patent application, the surface of these elements should be rolled in the transverse, circumferential direction, i.e. in substantially perpendicular direction to the main working stresses.

The same apparatus is recommended for treating the interior surfaces of hollow members, cylinders, hollow shafts (marine shafts), pressure tubes, gun barrels, drill pipes and the like and connectors of all these elements by rolling at least one zone, using different combinations of rollers, the whole surface of these elements in order to obtain the beneficial effect similar to the so-called "auto-frettage." This new method of mechanical auto-frettage by internal rolling or internal over-rolling of hollow members is based on plastic deformation by rolling or squeezing of the interior of these structural elements to a depth as required by dimensions and future applications and loading conditions of these elements.

Auto-frettage is a known process for manufacturing pressure vessels, in which the inner-surface layers of a plain tube are stressed by expansion beyond the yield strength by hydraulic pressure, so that residual compressive stresses are created.

I claim:

1. A method of improving the fatigue resistance of structural metal members having a heat treated portion comprising subjecting at least adjoining parts of the heat treated and untreated portions of said members to pressures beyond the elastic limit of said portions and at spaced intervals sufficient to provide plastically deformed depressions between one-thousandth of an inch and one-sixteenth of an inch deep, said intervals being interspaced with substantially undeformed portions to provide locked-in residual stresses which resist fatigue, the distance between said depressions being between about one-eighth of an inch and about one-sixty-fourth of an inch, said distance being greater than the depth of said depressions.

2. The method of claim 1 in which the plastically deformed depressions are between one-two-hundredth of an inch and one-sixty-fourth of an inch deep.

3. The method of claim 1 in which the plastically deformed depressions are helical in configuration.

4. A method of improving the fatigue resistance of structural metal members comprising subjecting by cold working the surface of said members to pressures beyond the elastic limit of said portions and at spaced intervals sufficient to provide plastically deformed depressions between one-thousandth of an inch and one-sixteenth of an inch deep, said intervals being interspaced with substantially undeformed portions to provide locked-in residual stresses which resist fatigue, the distance between said depressions being between about one-eighth of an inch and about one-sixty-fourth of an inch, said distance being greater than the depth of said depressions.

References Cited in the file of this patent

UNITED STATES PATENTS

| | | |
|---|---|---|
| 581,459 | Goddu | Apr. 27, 1897 |
| 1,329,762 | Guy | Feb. 3, 1920 |
| 1,386,156 | Butterfield | Aug. 2, 1921 |
| 1,394,716 | Davies | Oct. 25, 1921 |
| 1,784,866 | Fahrenwald | Dec. 16, 1930 |
| 1,789,308 | Hatcher | Jan. 20, 1931 |
| 2,062,459 | Lee | Dec. 1, 1936 |
| 2,078,434 | Wise | Apr. 27, 1937 |
| 2,118,524 | Rea | May 24, 1938 |
| 2,304,976 | Watter | Dec. 15, 1942 |
| 2,349,863 | Hallberg | May 30, 1944 |
| 2,407,552 | Hoesel | Sept. 10, 1946 |
| 2,424,092 | Hammond et al. | July 15, 1947 |
| 2,557,722 | Brauchler | June 19, 1951 |
| 2,565,623 | Parker | Aug. 28, 1951 |
| 2,589,881 | Sims et al. | Mar. 18, 1952 |

OTHER REFERENCES

Metals Handbook, 1939 Ed. (page 888, L. 8–L. 15 relied on).